(12) United States Patent
Beisiegel et al.

(10) Patent No.: US 9,336,037 B2
(45) Date of Patent: May 10, 2016

(54) ANALYTICS PLATFORM SPANNING A UNIFIED SUBNET

(71) Applicant: International Business Machines Corporation, Armonk, NY (US)

(72) Inventors: Michael Beisiegel, San Carlos, CA (US); Dinakaran Joseph, Apex, NC (US); Devaprasad K. Nadgir, Bangalore (IN); Ramkumar Ramalingam, Theni (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/068,105

(22) Filed: Oct. 31, 2013

(65) Prior Publication Data
US 2015/0121368 A1    Apr. 30, 2015

(51) Int. Cl.
*G06F 9/455*    (2006.01)
*G06F 15/173*    (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| 7,290,048 B1* | 10/2007 | Barnett et al. ............... 709/223 |
| 8,255,529 B2 | 8/2012 | Ferris et al. |
| 2010/0306767 A1* | 12/2010 | Dehaan ............................ 718/1 |
| 2011/0295999 A1 | 12/2011 | Ferris et al. |
| 2012/0066487 A1 | 3/2012 | Brown et al. |
| 2013/0060933 A1 | 3/2013 | Tung et al. |
| 2013/0111476 A1 | 5/2013 | Medovich |

OTHER PUBLICATIONS

"Deploying Splunk Inside Virtual Environments", Splunk Inc., Tech Brief, Copyright © 2013 Splunk, Inc., provided by searcher on Aug. 5, 2013, splunk.com/web_assets/pdfs/secure/Splunk_and_VMware_VMs_Tech_Brief.pdf>.
U.S. Appl. No. 13/853,700, entitled "Analytics Based on Pipes Programming Model", filed Mar. 29, 2013.

* cited by examiner

*Primary Examiner* — Abdullah Al Kawsar
*Assistant Examiner* — Bing Zhao
(74) *Attorney, Agent, or Firm* — David B. Woycechowsky

(57) ABSTRACT

Determination and indication of operational performance of deployments in an expert integrated system that has multiple deployments, with each deployment having multiple patterns. The determination is based upon pipe analytics, with the pipe analytics being performed over a common subnet that includes both the analytics platform and the management nodes of each deployment of the multiple deployments.

6 Claims, 6 Drawing Sheets

900

1000

ANALYTICS PLATFORM SPANNING A UNIFIED SUBNET

FIELD OF THE INVENTION

The present invention relates generally to the field of expert integrated systems that have deployment groups made up of virtual machines, where the deployment groups are organized into sub-sets, based on function, called patterns.

BACKGROUND OF THE INVENTION

An expert integrated system is a set of components and servers. Traditionally, an expert integrated system took the form of a factory pre-configured set of hardware that could be physically delivered to a location, or locations. More recently, many expert integrated systems have become cloud based, so that there is not a strong correlation between the services provided to the expert systems customer and the specific, real world physical components that make up the expert integrated system at a given time.

Expert integrated systems include: (i) a flexible software-based system manager; and (ii) "patterns of expertise" for the automated configuration and management of the services provided by the expert integrated system. The patterns of expertise can provide field engineers' expertise from decades of system configuration. Preferably, these patterns of expertise offer industry-specific (for example, banking, insurance, automotive) defaults for the fully automatic and optimal orchestration of resources (for example, workload balancing).

Expert integrated systems may use various operating systems (now known or to be developed in the future). Expert integrated systems may include various kinds of hypervisors for various kinds of hardware architectures (for example, power architecture and/or x86). At least some expert integrated systems can be described as "converged systems," with these converged systems combining the functionality of an appliance with the flexibility of an arbitrarily scalable system.

Some cloud-based expert management systems: (i) manage hybrid cloud infrastructure environments "out of the box;" (ii) combine integrated hardware and software in a manner that can be easily maintained; and (iii) include server machines (for example, server blades) that host virtual-machine-based compute nodes.

A cloud group in an expert integrated system consists of one or more "deployments." Each deployment is a set of virtual machines located in the cloud. Each deployment is also broken into patterns, with each pattern providing different functionality. There is not generally a one-to-one correspondence between the virtual machines of a deployment and the patterns of the same deployment. The patterns include: (i) virtual machines (VMs); (ii) physical host computers (physical hosts); (iii) configurations (iv) policies; and (v) shared services.

SUMMARY

An expert integrated system, and associated method, including: multiple deployments; and an analytics platform. Each deployment is respectively characterized by a plurality of patterns, with each pattern representing a set of data processing tasks. Each deployment includes a plurality of virtual machines programmed to perform the data processing associated with the deployment's plurality of patterns. Each deployment further includes a set of management nodes structured, programmed and/or connected to manage the deployment's virtual machines. The analytics platform is structured, programmed and/or connected to collect analytics input data from the set of management nodes of each deployment of the plurality of deployments. The analytics platform is further structured, programmed and/or connected to perform analytics processing on the analytics input data to provide analytics output data that relates to operational performance of each deployment.

DETAILED DESCRIPTION

Some embodiments of the present disclosure recognize the following: (i) an administrator of an expert integrated system (also sometimes referred to, more simply as an "expert system") cannot easily, or automatically, get a holistic view of how virtual machines are participating in different solutions across different deployments; (ii) an administrator of an expert integrated system would benefit from being able to get certain insights for his deployments; (iii) there are conventional solutions that provide individual VM level details in terms of monitoring of CPU (central processing unit), Memory, Disk I/O (input/output), etc.; (iv) conventionally, there is no single system that can run analytics on all the collected data across deployments; and (v) conventionally, there is no single system that provide a holistic "score" of individual deployments to be able to drill down to individual VM usage. With respect to item (ii) of the foregoing list, the certain insights may include: (a) what systems are participating across his cloud groups?; (b) what is the utilization of individual VMs in each cloud group?; (c) what is the overall utilization of his cloud groups?; (d) why are some VMs within the cloud groups utilized less than others?; and/or (e) insights of different deployments running within the cloud groups.

Some embodiments of the present disclosure: (i) provide a method, apparatus and architecture for achieving cross-deployment visibility and analytics; (ii) relate to deployments, in expert integrated systems or cloud deployments, of virtual machine sets; and/or (iii) provide for different deployments, in an expert integrated system or in the cloud, to be viewed for activity by analyzing different data sets available from the virtual machines in the deployments and other data available in the management layer of the expert systems. If there are multiple expert integrated systems participating to support patterns, this analytics platform is deployed in a way to hold operational data from multiple management layers belonging to the same cluster, thereby giving a holistic data cluster for performing analytics.

Figure 1:
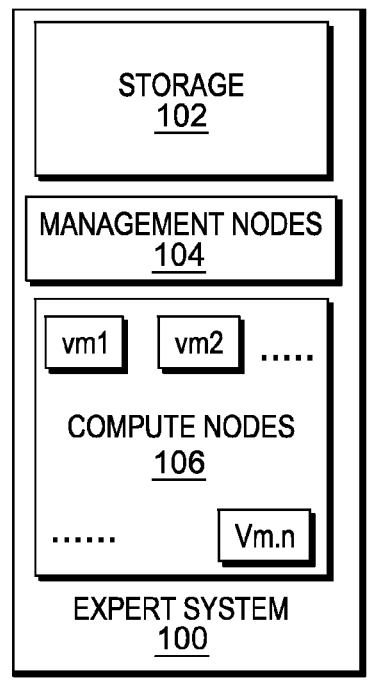
FIG. 1 is a schematic view of a portion of a first embodiment of a networked computers system according to the present invention.
Figure 2:
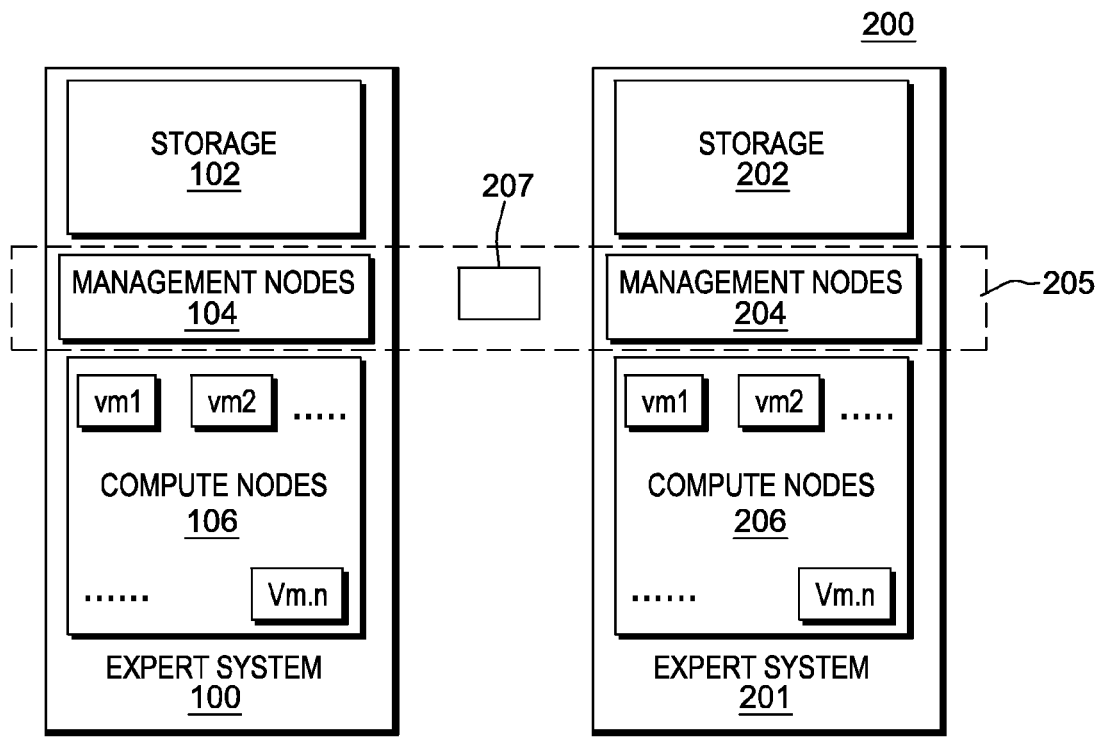
FIG. 2 is a schematic view of the first embodiment system.
Figure 3:
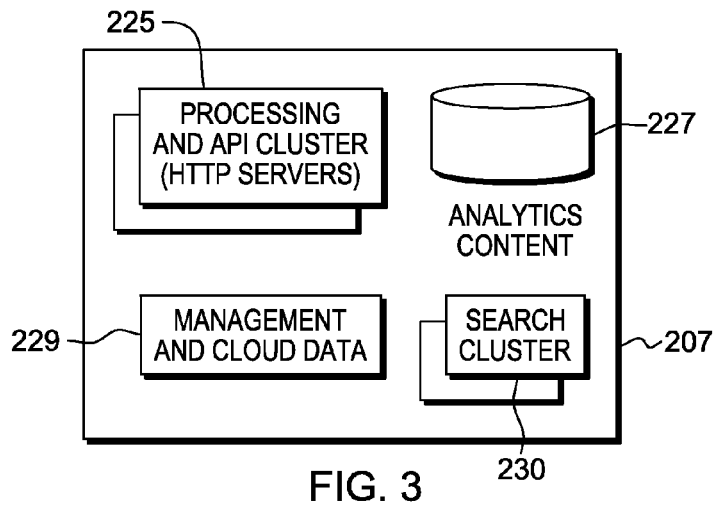
FIG. 3 is a schematic view of another portion of the first embodiment system.

As shown in FIGS. 1, 2 and 3, high level expert integrated system 200; first constituent expert integrated system 100; second constituent expert integrated system 201; subnet 205; and analytics platform 207. Expert integrated system 100 includes: storage device set 102; management nodes 104; and compute nodes set 106. Expert integrated system 201 includes: storage device set 202; management nodes 204; and compute nodes set 206. As shown in FIG. 3, analytics platform 207 includes: analytics platform component (also called processing and API (application program interface) cluster) 225; analytics content data store 227; management and cloud data component 229; a search cluster set 230.

In this cloud-based system 200, compute nodes 106, 206 are each in the form of a set of virtual machines (VMs). In this embodiment, the number and type of virtual machines in a set of compute nodes will remain constant over time. Alternatively, the number and type of virtual machines in a set of compute nodes may change over the course of the operation of a deployment. Expert system 100 can be considered as a first deployment (with the VMs of compute nodes set 106 being its deployment group). Each deployment group is a logical grouping of a set of assigned compute nodes (or VMs) so that a "pattern" can be realized (that is, deployed and made to run).

Expert integrated system 100 forms the basis for deployments suitable for use with embodiments according to the present disclosure. A "deployment" is a configuration of virtual machines working together to provide a holistic solution for a set of components working together. In this embodiment, pattern-to-VM mapping has a static initial configuration to reflect the minimum number of VMs required to run the pattern. However, once the pattern is realized, there are policies in the patterns that can help "scale" out the solution by adding (or deleting) new VM instances.

Management nodes 104 provide a management interface for the deployment within integrated expert system 100. These management functions typically include: provisioning of nodes of a deployment to the patterns of the deployment, placing the servers and storage (in this embodiment, in this context, this is a hardware allocation), logging different changes to the deployment, etc. In this embodiment, the various management nodes 104, 204 are implemented in hardware as blade servers. The blade servers (also called, "management blades") of management nodes 104 and management nodes 204 are located in a common (also called, unified) subnet 205, along with analytics platform 207. In this way, analytics platform 207 can easily and continuously get input data, related to operation of the various patterns of the multiple deployments, upon which to perform analytics processing.

Providing an analytics platform for expert systems set 200, across different expert systems 100, 201, for deployment is achieved by locating analytics platform 207 along with the management nodes in unified subnet 205. The management blades are configured in the same subnet of IP (internet protocol) addresses in order to provide a unified data collection and analytics base for deployments spanning across multiple expert systems as shown by subnet 205 in FIG. 2, which encompasses all management nodes for the two deployments, along with platform 207.

Analytics platform 207 performs deployment analytics and deployment visibility with respect to an expert integrated system. Analytics platform component 225 is a processing and API (application programming interface) cluster (http (hypertext transfer protocol) servers) set (also referred to more simply as "Processing and API Clusters"). Analytics platform component 225 is located among and between management nodes 104, 204.

In this embodiment: (i) the Processing and API Cluster is a set of http servers hosting processing of API requests including analytics pipe execution and visualization; (ii) search cluster set 230 holds a distributed cluster of nodes within the management layer of data collected from the management layer; (iii) management and cloud data component 229 stores data provided by the management layer, like logs for individual deployments and VM specific monitoring data in the management layer, and data for any audit events like changing of a configuration of a deployment; and (iv) analytic content data store 227 is the data and logic used to determine the status and score of deployments within the set of expert integrated systems 200. Analytic content data store 227 is considered as a layer that includes data an/or logic for handling different error messages, message IDs, deployment IDs, and "pipes" that determine the overall status and health of deployments.

Detailed steps that are executed to arrive at a holistic "score" for the deployment will be discussed in more detail, below. At a high level, the following data set is collected in the analytics platform running in the management layer: (i) statistics from virtual machines current status like CPU, Memory, I/O, Transfer Rates, disk usage, etc.; (ii) logs from the management layer for deployments (including placement of servers, audit, UI (user interface), servers, asynchronous jobs, virtualization APIs, etc.); and (iii) logs from the deployment patterns (including application specific logs from deployments (for example, application server logs from a conventional virtual machine application pattern)).

By default there are algorithms built to identify the score based on the following criteria: (i) each deployment is identified with a deployment pattern that is hosted in it along with the list of Virtual Machines participating in the deployment; and (ii) score for each deployment is evaluated based on: (a) errors and/or warnings found in the deployment and management logs, and (b) Virtual Machine status, such as ON/OFF status. A lower score for deployment means a healthier deployment of the virtual application pattern in that deployment.

Figure 4:
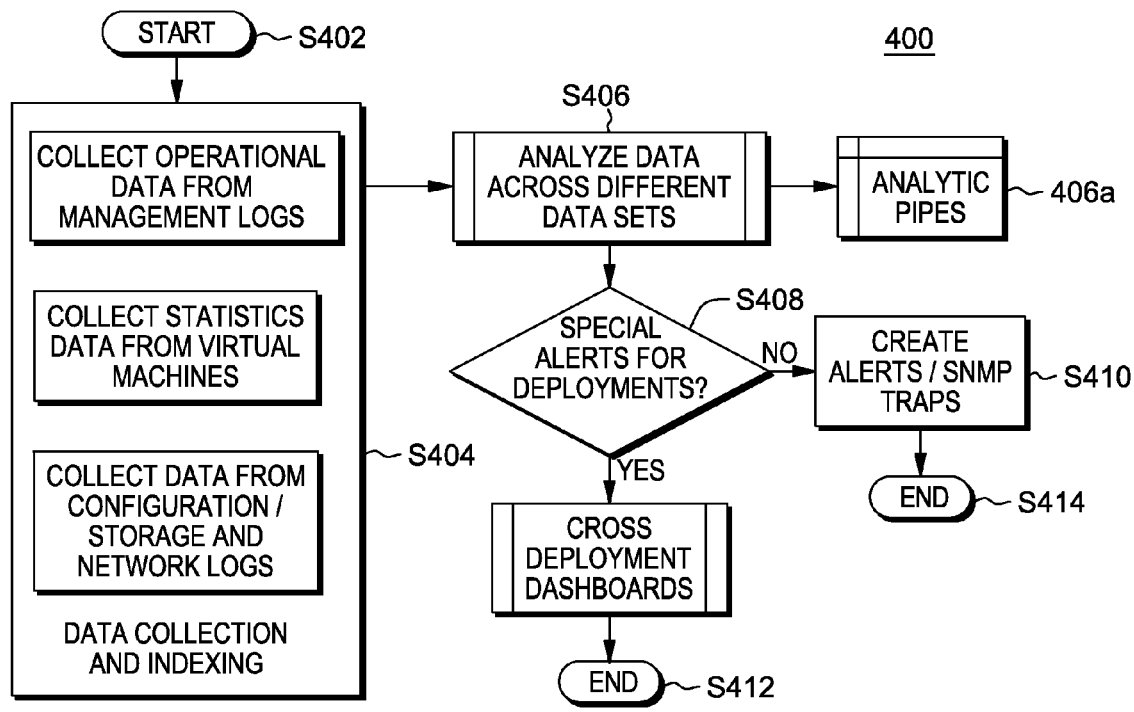
FIG. 4 is a flowchart showing a process performed, at least in part, by the first embodiment system.
Figure 7:
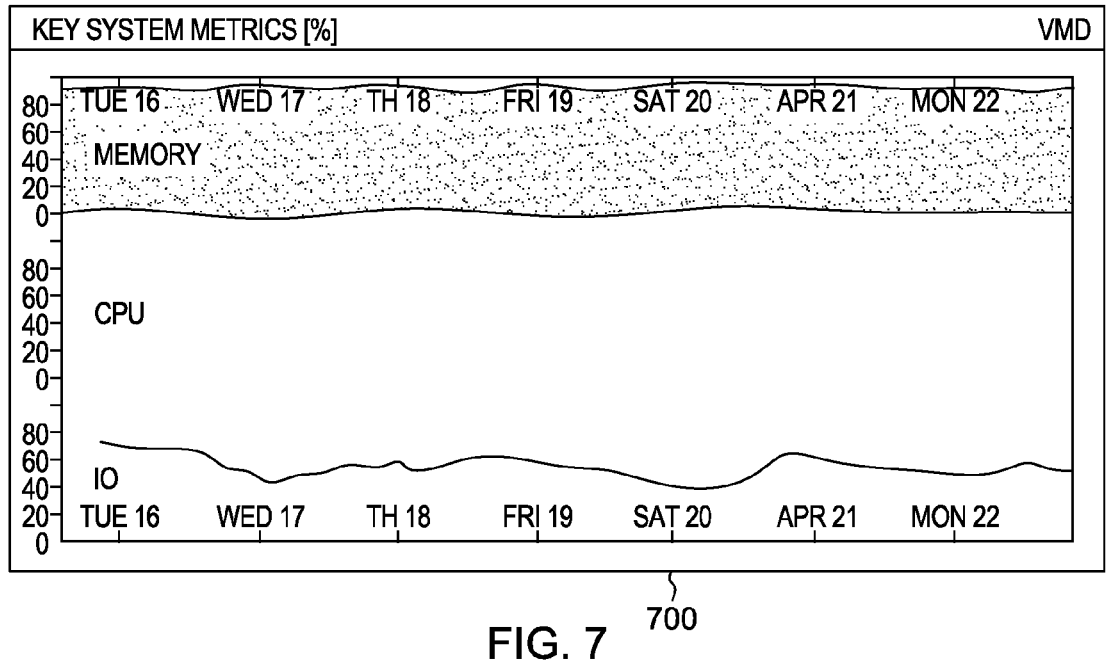
FIG. 7 is a third screenshot generated by the first embodiment system.
Figure 8:
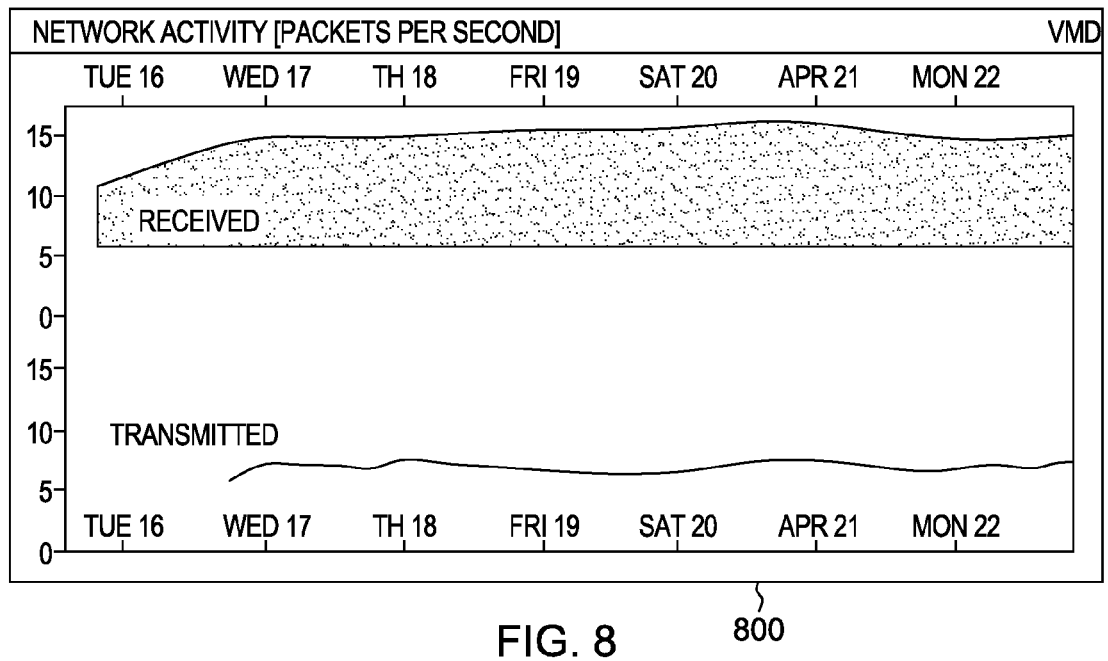
FIG. 8 is a fourth screenshot generated by the first embodiment system.
Figure 9:
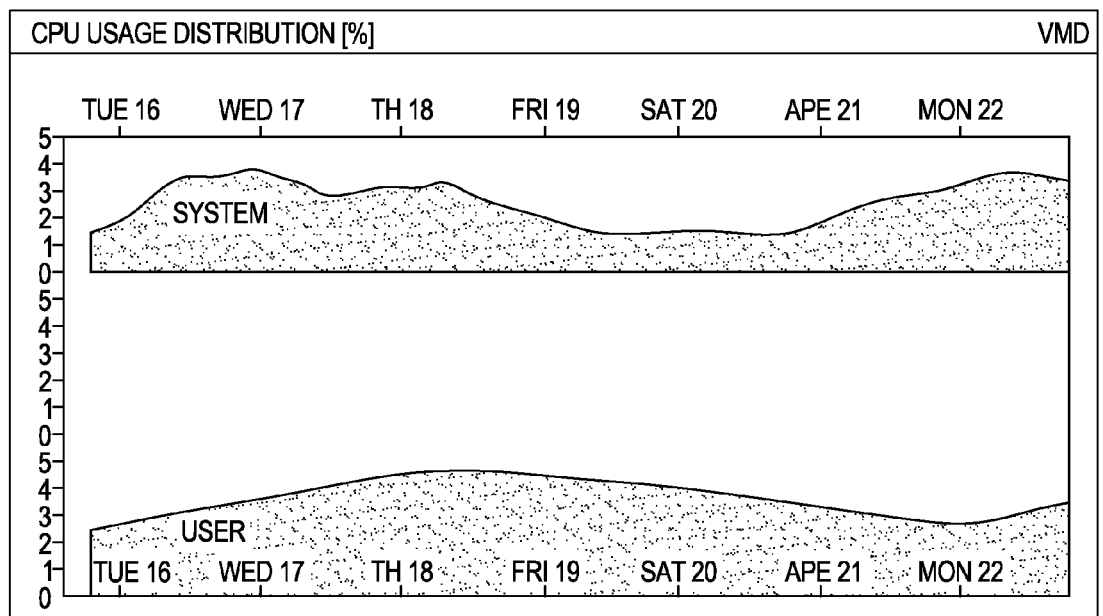
FIG. 9 is a fifth screenshot generated by the first embodiment system.
Figure 10:
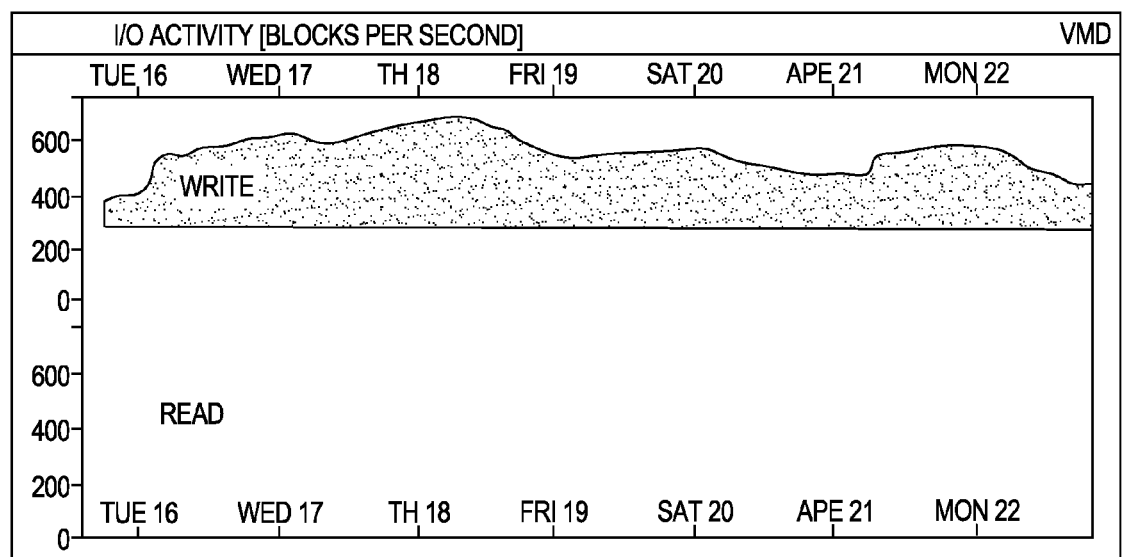
FIG. 10 is a sixth screenshot generated by the first embodiment system.

As shown in FIG. 4, flowchart 400 explains high level steps that are followed to: (i) collect analytics inputs management nodes which, collectively, control multiple deployments, and multiple patterns within each deployment; (ii) perform analytics processing on the analytics inputs to generate analytics outputs which represent meaningful performance for evaluating the performance of deployments, patterns and/or individual VMs; and (iii) display the analytics output to a human user in human readable form and format (this last step is called deployment visibility). More specifically, process flow among and between the various steps, S402, S404, S406, S408, S410, S412, S414, is shown in FIG. 7, with each block in the flow chart explaining its associated step or action. Block 406a is set forth to explain that, in this method embodiment 400, step S406 is performed by pipe analytics.

In this embodiment, the analytic content store is an extensible pipe programming model based analytics platform that can let customers define a custom way of defining a score. Extensible pipe programming model based analytics (sometimes herein referred to more simply as "pipe analytics") is based on a pipes programming model. The present technology introduces a concept termed herein as a "pipe." A pipe, as described herein, represents a logical construct that includes search, data manipulation, scoring and visualization instructions defined within a supporting programming/scripting language syntax (e.g., Python, though many others are possible). (Note: the term "Python" may be subject to trademark rights in various jurisdictions throughout the world and are used here only in reference to the products or services properly denominated by the marks to the extent that such trademark rights may exist.) A "pipes programming model" provides an architecture that defines and executes a "pipe" with a sequential search, modification/cleansing of searched data, and visualization of the data using a single thread request/response paradigm. As such, the pipes programming model provides compartmentalized processing of several analytical operations on data and the return of results of the analytical operations using a single hypertext transfer protocol (HTTP) request, a single HTTP thread of operation at an HTTP server, and a single HTTP response from the server by the single server HTTP thread. A "piped HTTP request" represents an HTTP request that includes/encapsulates scripted code that is requested to be executed against a data set by the HTTP server under the single thread of operation. The execution of the scripting language may be performed in a native scripting language runtime associated with the scripted code by the single thread of operation. A "piped HTTP response," as described herein, represents an HTTP request that includes/encapsulates the results of execution of scripted code returned by the single HTTP thread that are created in response to receipt of the piped HTTP request. The scripted code may include scripted syntax executable to perform search functions, data manipulation functions, and data visualization functions. As such, the pipes programming model described herein provides a comprehensive solution to data analytics that may improve data analysis for data sets, including large distributed search clusters.

The analytics processing, described above, leads to various forms of analytics output, such as health ratings and usage ratings. In this embodiment, these analytics outputs are displayed to human users in human understandable form, as shown in screenshots 500, 600, 700, 800, 900 and 1000, respectively of FIGS. 5, 6, 7, 8, 9 and 10. Screenshots 500, 600, 700, 800, 900 and 1000 form an example of "deployment visibility."

More specifically, screenshot 500 shows deployment health on a pattern by pattern basis for a single deployment where: (i) the cross-hatch pattern of the various patterns indicates their relative health levels; and (ii) the area of each rectangle for each respective pattern indicates that pattern's usage level. This view gives overall deployment health across deployments supported by Expert Integrated Systems. A score based on errors/warnings and status of the VM determines whether individual deployments are 'Active', 'With Warnings' or 'With Errors.' In other words, screenshot 500 is a view of multiple deployments arranged by score and evaluated status like Active, Warnings, Errors for individual deployments.

Screenshot 600 drills down a level to show the various VMs (VMs A to E, in this example) that are co-operatively working on a single pattern. The relative area of the rectangles respectively representing each VM indicates the average percentage of a metric being measured. For example, a 10% to 20% average CPU usage of a VM reflects a smaller area and a different color as opposed to 90% to 100% usage of CPU with a bigger area and an eye catching color to indicate the potentially abnormal behaviour. In screenshot 600, the cross-hatch pattern corresponds to VM usage, with high usage often being indicative of an operational issue or problem. A deployment consists of individual virtual patterns and VM images that constitute a deployment. In screenshot 500, cross cloud visibility architecture allows drill down of individual deployment view of all the virtual machines participating.

Screenshots 700, 800, 900 and 1000 drill down yet another level to show metrics and/or statistics relating to the operational performance of a single VM (in this example, VM D). In this example, the statistics are given as graphs spanning a period of about a week, but non-graphical information displays and/or other time scales are also possible, additionally or alternatively.

Some embodiments of the present disclosure may have one, or more, of the following features, characteristics and/or advantages: (i) multiple deployments with virtual application patterns analysis based on scoring; (ii) virtual application deployment alerts across different deployments within a cloud group; (iii) clustered data analytics across expert integrated cloud hosting systems using a common subnet; (iv) architecture and method to gather and analyze VM data of a cloud deployment or expert system; (v) unique visualization(s) to get insight into the pattern of VM visualization; and/or (vi) method for scoring multiple deployments within a cluster of expert integrated system.

In some embodiments of the present invention, other screenshots, representing other forms of deployment visibility are possible. For example, there may be: (i) human readable alerts, specific to a problem deployment, based on the information analyzed across different logs for the deployment; (ii) an SNMP trap or events, specific to identification of cross deployment alert situations; (iii) email and/or instant message alerts to human users that indicate pattern and/or deployment problems or status updates of interest; and/or (iv) alerts and/or output sent to external computer based systems and software for more detailed diagnostics and/or historical information collection purposes.

Some embodiments of the present invention include one, or more, of the following features, advantages and/or characteristics: (i) captures different cloud groups (group of virtual application patterns) and not confined to single deployment and/or single independently addressable network or sub-network; and/or; (iii) applies analytics to virtual application patterns, supported within expert integrated systems and cloud groups running these virtual application patterns, for the building blocks that form the kernel of the expert integrated systems.

The following paragraphs set forth some Definitions for certain words and/or phrases used in this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii)

data communication where the format, packetization status, medium, encryption status and/or protocol remains constant over the entire course of the data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Subnet: includes: a subset portion of a larger network or an independent and free-standing network; a subnet may include subnets within it as constituent parts.

Figure 5:
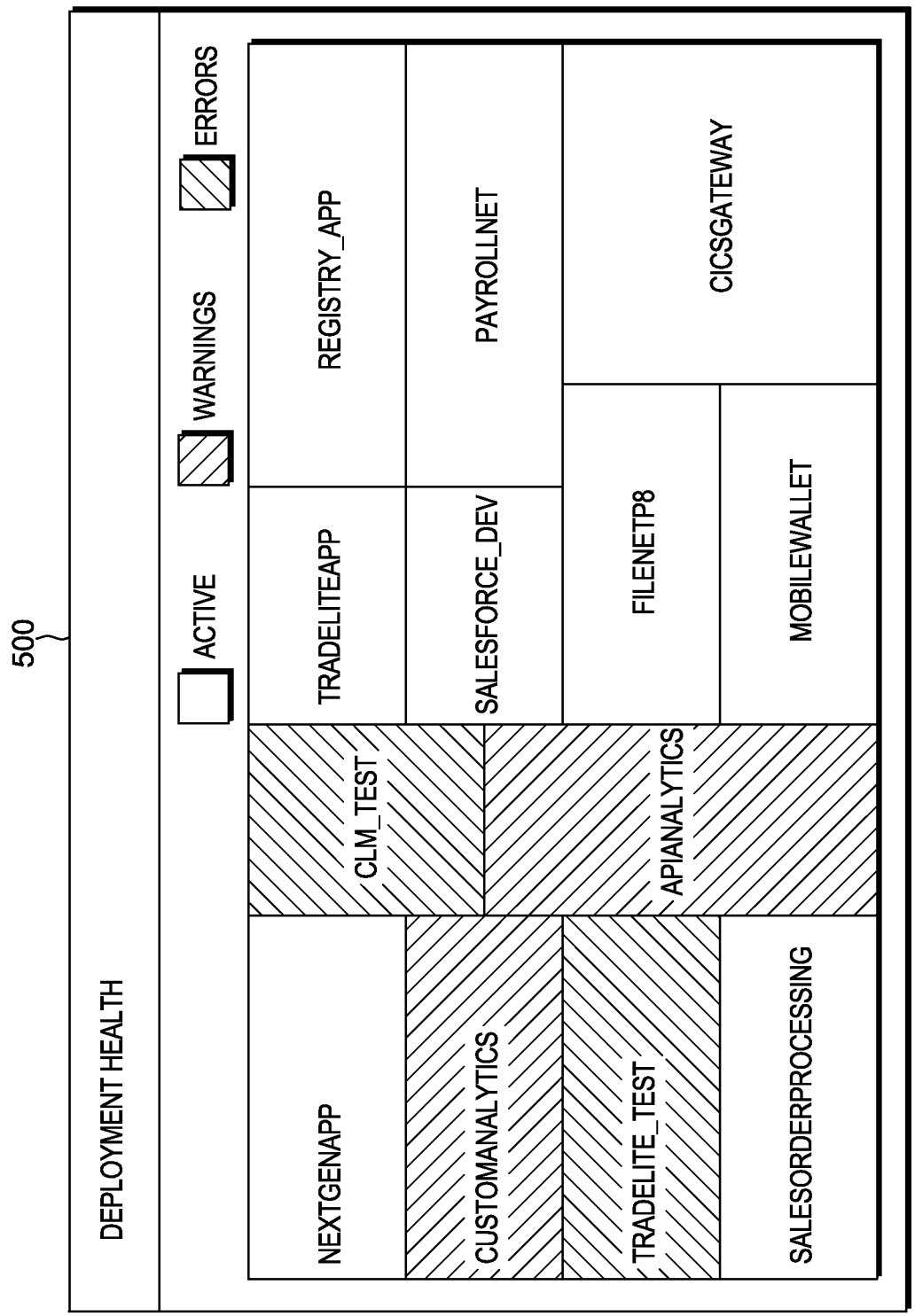
FIG. 5 is a first screenshot generated by the first embodiment system.
Figure 6:
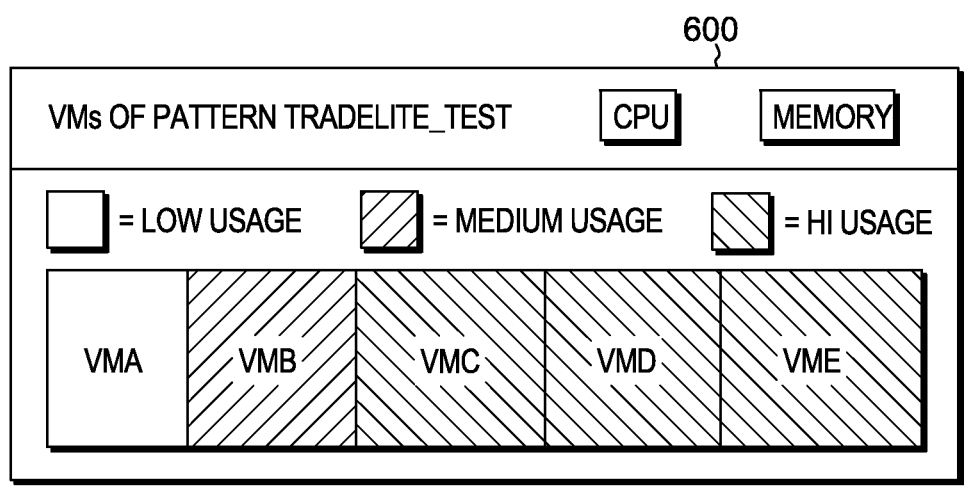
FIG. 6 is a second screenshot generated by the first embodiment system.

Presentation module: any set of hardware, software and/or firmware that can present human understandable data to a human user (for example, by visual presentation, audio presentation, tactile presentation, etc.); for example, a presentation module may include a display device and the hardware and software that generates a display for the display device; the screenshot 500 of FIG. 5 is an example of presentation displayed by a presentation module.

Management module: any set of hardware, software and/or firmware that works with a management layer; items 229 and 230 of FIG. 3 are an example of an analytics module.

Analytics module: any set of hardware, software and/or firmware that can perform analytics; items 225 and 227 of FIG. 3 are an example of an analytics module.

What is claimed is:

1. A method of operating an expert integrated system comprising:
    providing an expert operating system including a plurality of deployments and an analytics platform, in which:
        each deployment is respectively characterized by a plurality of patterns,
        each pattern represents a set of data processing tasks,
        each deployment includes a plurality of virtual machines programmed to perform the data processing associated with the deployment's plurality of patterns, and
        each deployment further including a set of management nodes structured, programmed and/or connected to manage the deployment's plurality of virtual machines;
    collect, by the analytics platform, analytics input data from the set of management nodes of each deployment of the plurality of deployments;
    performing, by the analytics platform, analytics processing on the analytics input data to provide analytics output data that relates to operational performance of each deployment;
    providing a unified subnet that is at least substantially limited to providing communication between the analytics platform and the sets of management nodes of the deployments of the plurality of deployments, with the unified subnet taking one of the following forms: a subset portion of a larger network, or an independent and free-standing network;
    performing analytics, under a pipe analytics model, on the analytics input data to provide analytics output data that relates to operational performance of each pattern within a deployment wherein the pipe analytic model, which is based on hypertext transfer protocol, provides an architecture that defines and executes a pipe with a sequential search, modification/cleansing of searched data, and visualization of the data using a single thread request/response paradigm; and
    presenting at least a portion of the analytics output data in human understandable form and format.

2. The method of claim 1 further comprising:
    holding a distributed cluster of nodes within a management layer so that data is collected from the management layer;
    aggregating the analytics input data provided by the management layer; and
    applying analytics-level machine logic to the analytics input data to generate the analytics output data.

3. The method of claim 1 wherein:
    the plurality of deployments includes a first deployment and a second deployment;
    the first deployment includes a first set of management nodes;
    the second deployment includes a second set of management nodes;
    the first set of management nodes is located in a first cloud;
    the second set of management nodes is located in a second cloud; and
    the subnet extends across at least the first and second clouds.

4. The method of claim 1 wherein the management nodes are in the form of management blades.

5. The method of claim 1 wherein the analytics output data includes information indicative of performance of a set of patterns of a deployment on a pattern-by-pattern basis.

6. The method of claim 1 wherein the analytics output data includes information indicative of a set of virtual machines of a deployment on a virtual-machine-by-virtual-machine basis.

* * * * *